April 9, 1935.                U. LOSER                    1,997,423
      APPARATUS FOR COMPENSATING VIBRATIONS IN SHIPS AND OTHER STRUCTURES
                     Filed March 21, 1933      11 Sheets-Sheet 1

INVENTOR
UGO LOSER
BY Haseltine Lake & Co.
ATTORNEYS

April 9, 1935.

U. LOSER 1,997,423

APPARATUS FOR COMPENSATING VIBRATIONS IN SHIPS AND OTHER STRUCTURES

Filed March 21, 1933

INVENTOR
UGO LOSER
BY Haseltine, Lake & Co.
ATTORNEYS

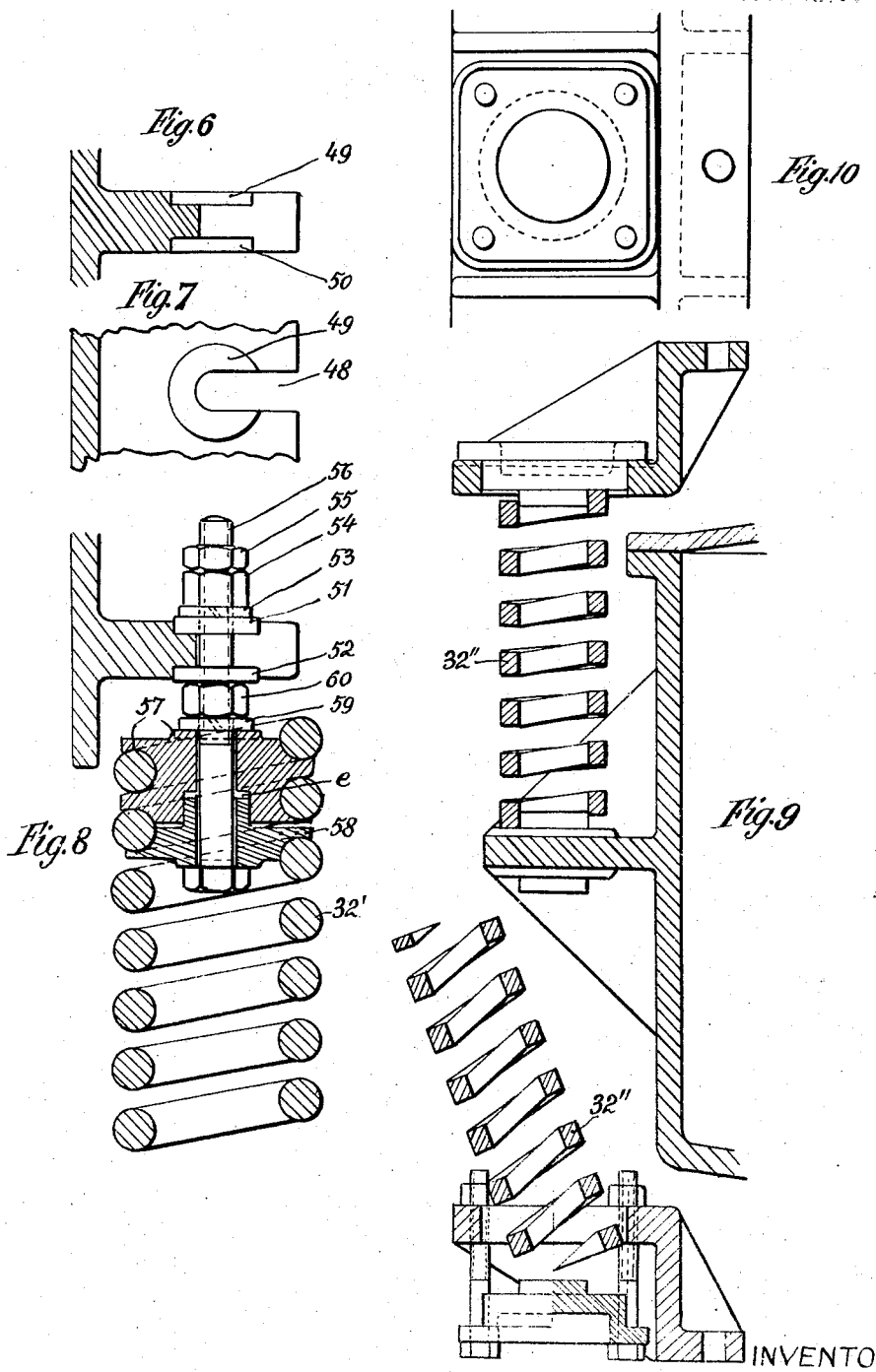

April 9, 1935.  U. LOSER  1,997,423
APPARATUS FOR COMPENSATING VIBRATIONS IN SHIPS AND OTHER STRUCTURES
Filed March 21, 1933  11 Sheets-Sheet 5
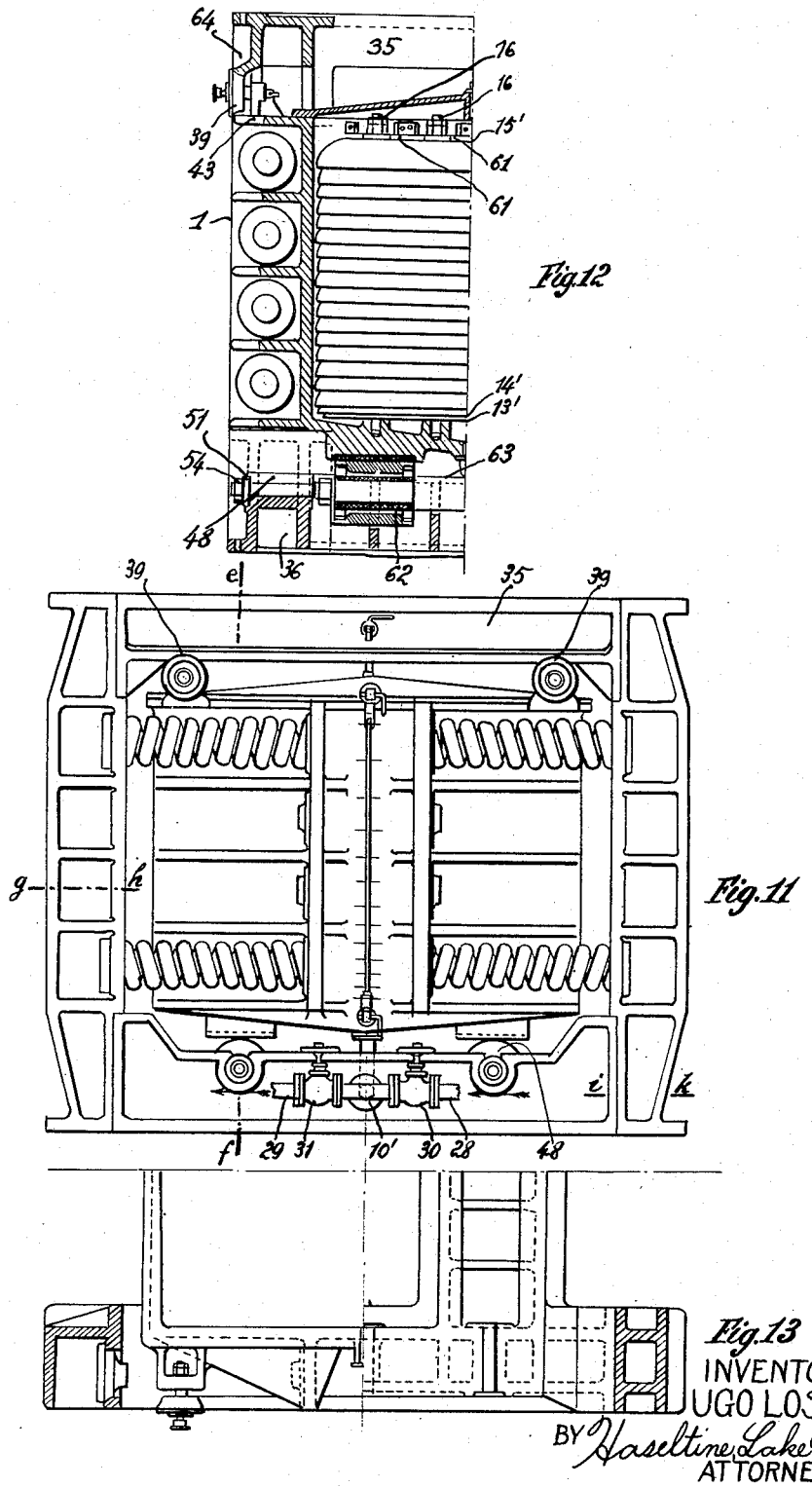
INVENTOR
UGO LOSER
BY Haseltine Lake & Co.
ATTORNEYS INVENTOR
UGO LOSER
BY Haseltine Lake & Co.
ATTORNEYS April 9, 1935. U. LOSER 1,997,423
APPARATUS FOR COMPENSATING VIBRATIONS IN SHIPS AND OTHER STRUCTURES
Filed March 21, 1933 11 Sheets-Sheet 9

INVENTOR
UGO LOSER
BY Haseltine, Lake & Co.
ATTORNEYS

April 9, 1935.  U. LOSER  1,997,423
APPARATUS FOR COMPENSATING VIBRATIONS IN SHIPS AND OTHER STRUCTURES
Filed March 21, 1933  11 Sheets-Sheet 10

INVENTOR
UGO LOSER
BY Haseltine, Lake & Co.
ATTORNEYS

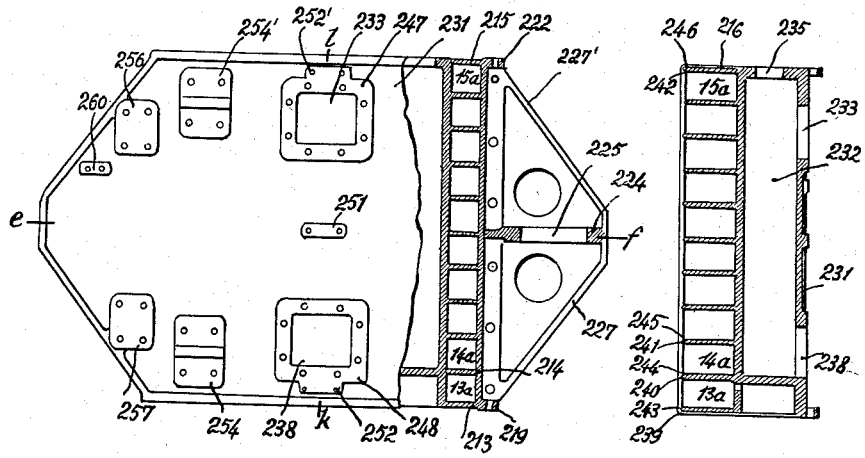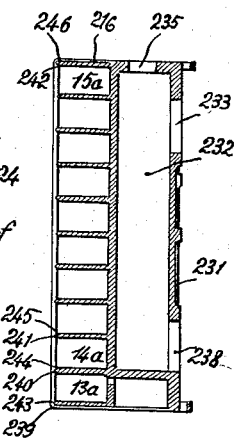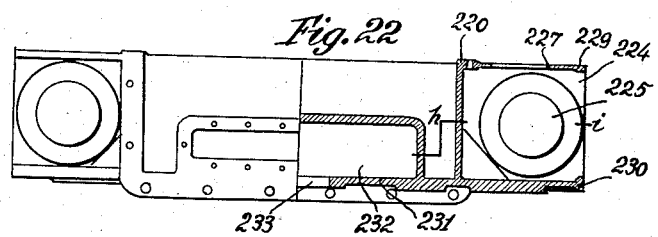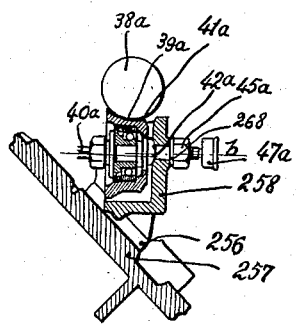

UNITED STATES PATENT OFFICE 1,997,423

APPARATUS FOR COMPENSATING VIBRATIONS IN SHIPS AND OTHER STRUCTURES

Ugo Loser, Trieste, Italy

Application March 21, 1933, Serial No. 662,007
In Italy April 2, 1932

12 Claims. (Cl. 114—0.5)

The problem of preventing the well-known phenomena of vibration, which occur in mechanical structures, buildings, and the like, stationary or mobile, and especially in ships, has up till now been studied from various points of view and in part has been solved, without, however generally satisfactory results being obtained. Technicians have hitherto endeavored in the naval constructional field to solve the said problem by devoting themselves to the immediate internal causes of the vibrating phenomena of the structures under consideration, that is, by varying as a whole and in their manner of distribution the masses weighing down on the structure, and also those constituting the structure itself, and the degree of elasticity of the same, principally by varying the curve of the moments of inertia and the curve of the distribution of the masses, in such manner as to prevent the occurrence of the phenomena of resonance between the frequencies of the vibrations of the structure itself and the frequencies of certain harmonic components of the forces transmitted to these by the operation of the motive apparatus.

This procedure requires long and laborious calculations and can only serve to determine successively single frequencies of particular vibrations of a varied nature either of the whole structure, or of any of its parts, with the result that in practice the technician does not complete such calculation in time and hence, there frequently persists, even in a structure thus calculated, some phenomenon of resonance and therefore of vibration.

Now the object of the inventor has been to solve the above-mentioned problem in a substantially different manner, so as to avoid the disadvantages mentioned, and obtain very satisfactory practical results. Basing his work on the phenomenon of resonance, obtainable with additional elastic masses, he has in fact evolved an apparatus applicable to any desired mobile or stationary vibrating structure, and in particular to ships, by means of which it is possible to compensate the vibrations at a variable or fixed frequency relative to the structure, acting only on those components of the forces applied to the structure which produce the vibrations themselves.

If the structure of which it is desired to practically suppress the vibrations is taken to be a rigid body supported by two fixed supports, to which body a harmonic force of constant frequency and amplitude is applied, by means of an elastic system, for example, by a spring having one end fixed to the rigid body, while the other end is fixed to a mass lying above this, the said system being able to vibrate freely, it is found that, leaving frictional forces out of account, the reaction transmitted to the rigid body by the supports is equal to the force thus applied, and this is a condition necessary for the rigid body to be at rest. The rigid body will also be at rest if for the reaction of the supports there is substituted any desired corresponding force acting on the rigid body.

Owing to the friction existing between the parts of the elastic system, the vibrations of the latter gradually disappear and at the same time the force exercised by the elastic system on the rigid body is also reduced. To prevent this, it would be necessary to have a force which would be superior to the friction, acting on the spring at the point of attachment between the mass and the spring above it.

Practical experiments have demonstrated that the frictional force can be assumed, with a sufficient degree of accuracy, to be directly proportional to the velocity of the harmonic oscillating movement of the elastic system. The force of friction corresponds however to a harmonic resistance having a lagging phase displacement of 90°, with regard to the moment of inertia of the mass lying above the spring, which acts on this latter. Therefore in order to maintain the harmonic oscillating movement of the mass with constant amplitude, it would be necessary to apply to the spring, at the point of attachment of this to the mass above, a harmonic force of equal frequency to that of the elastic system and of an intensity equal to the frictional force and having a leading phase displacement of 90° compared with the aforementioned moment of inertia.

In this condition of the elastic system the rigid body remains at rest. If now the force as before mentioned, instead of being applied at the point of attachment of the spring to the mass above, is applied to the point of attachment of the spring to the rigid body or to the rigid body itself, this point of attachment and thus also the rigid body must execute an alternating, harmonic, vertical movement, corresponding to the said force transmitted to it. If this latter force is combined with that previously referred to as acting on the rigid body, in place of the reaction on the supports, a greater harmonic resultant force is obtained having an anticipatory phase displacement in relation to the force transmitted to the rigid body of the elastic system. The smaller the frictional forces, the more fully the ideal condition described at the beginning is attained.

Now, reasoning in the reverse manner, it is obvious that a harmonic force may be assumed to be applied on the rigid body and having equal frequency to that of the elastic system combined with the rigid body, which force may be split up into two components, whose vectors are at right angles to each other, and to be exact, a horizontal component which is responsible for the occurrence of the first mentioned vibrations of the elastic system, and a vertical component which is equal to the force transmitted by the elastic system to the rigid body.

If then the frequency of the said components is less or greater than that of the particular vibrations of the elastic system, the phase displacement is not equal to 90° but is greater or less, and approaches practically two constant values in accordance with the external positions of the place in which the resonance occurs in practice.

The invention is in essence an apparatus formed by an elastic system to be placed in a position of the vibrating structure where a vibration of the same occurs. This position in the case of a ship, is the stem or the stern, and in general, every position with the exception of the nodal sections. The rigid body previously mentioned corresponds to the vibrating structure, to which the mechanical apparatus must be applied.

The invention is illustrated by way of example in the attached drawings, in which:—

Fig. 1, in the left half in front elevation and in the right half in vertical section, shows an apparatus embodying the invention intended to compensate vertical vibrations and applicable to a ship.

Figs. 6 and 7 show partly in section the details of attachment, in side elevation, and in plan, respectively, of the spring to the ribbing of the framework for connecting the apparatus to the structure of the ship.

Fig. 8 shows the details of a variant of attachment of the spring to the framework of the apparatus, with insertion of an intermediate piece which renders the spring shown independent of the attachment.

Figs. 9 and 10 show in cross-section and in plan from above, respectively, another arrangement of such a spring with intermediate attachment ribbing, permitting the easy substitution of the lower half (or the upper) of the spring by means of oblique withdrawal.

Fig. 11 is a front elevation of an apparatus according to the invention similar to that shown in Fig. 1, but intended to compensate horizontal vibrations. In this device the attachment of the springs is of the type indicated in Figs. 9 and 10.

Fig. 12 is a vertical cross-section of half of the apparatus on the line $e-f$ of Fig. 11.

Fig. 13 is a plan view of the same apparatus with the framework partly in section on the line $g-h$ of Fig. 11 for the left hand part of the view and on line $i-k$ of Fig. 11 for the right hand part.

Figure 14:
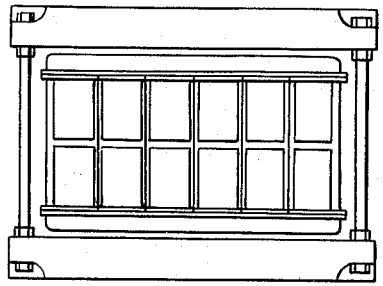

Figure 14 diagrammatically shows a practical form of a foundry model embodying the main feature of the invention.

Figure 15:
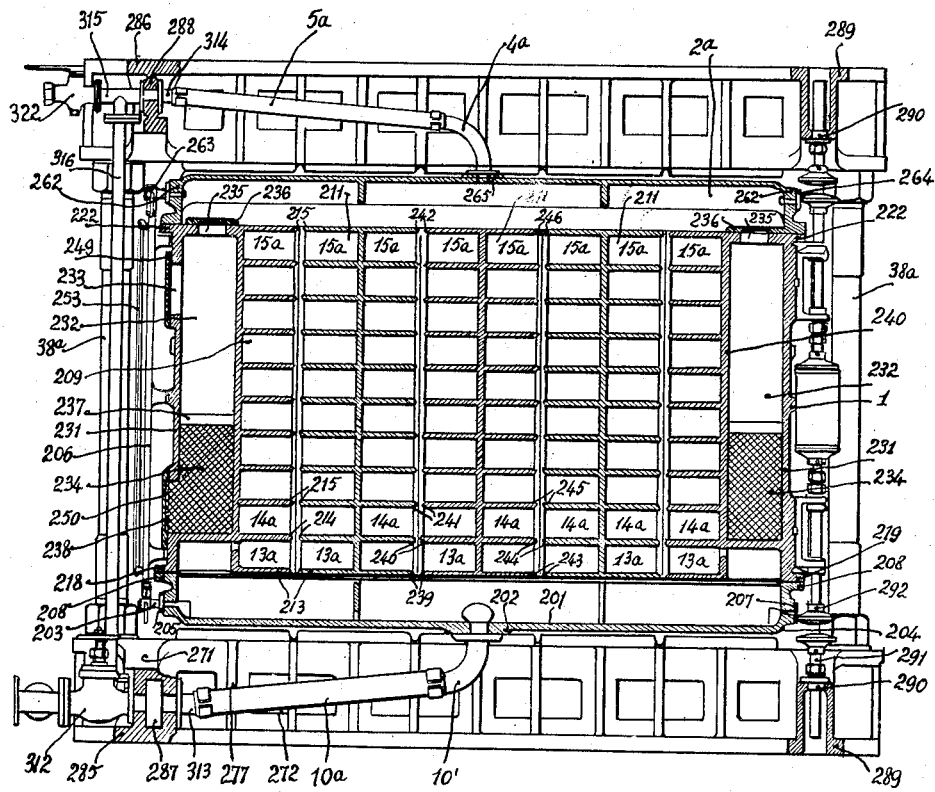

Figure 15 is a vertical section of a modification of the invention.

Figure 16:
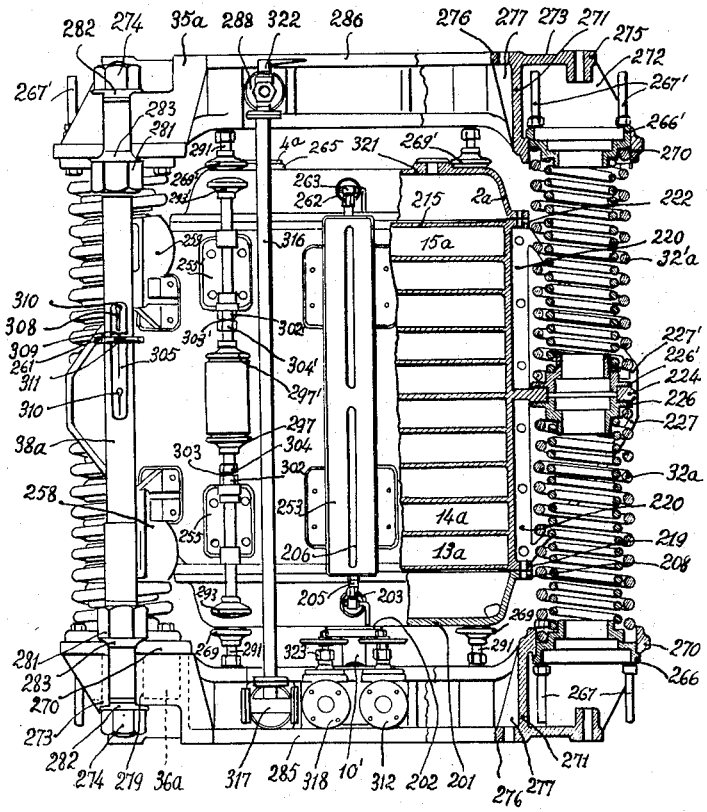

Figure 16 shows the same in side view for the left half, while the right half is a vertical section at right angles with regard to Fig. 15.

Figure 17:
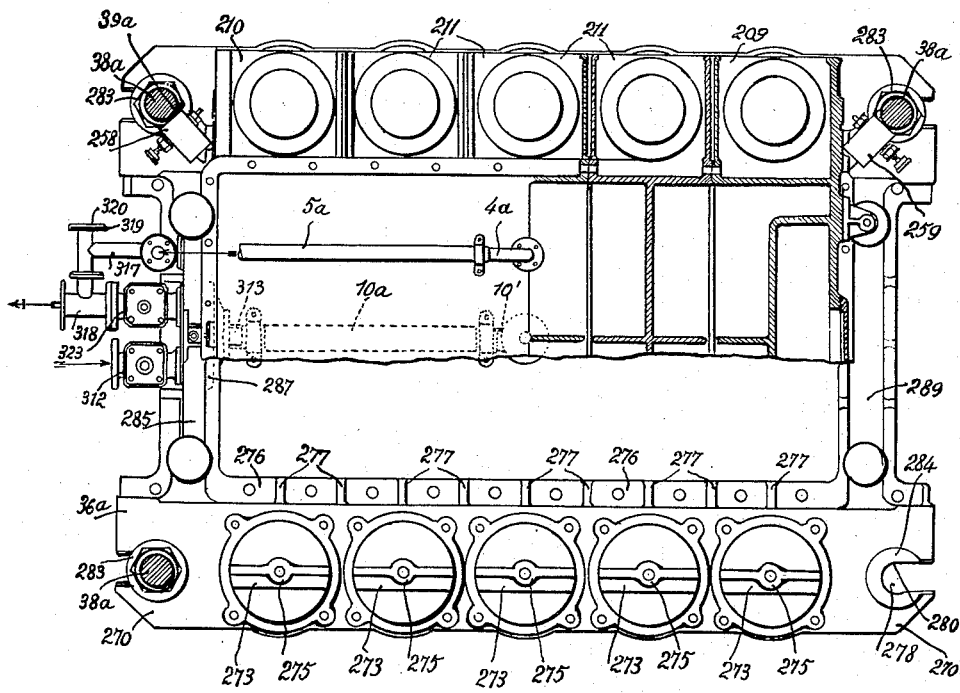

Figure 17 shows in the lower part a view from above of the lower framework, and in the upper part on the left a view of the apparatus from above, the upper framework not being shown, and on the right a horizontal section of the apparatus itself.

Figure 18:
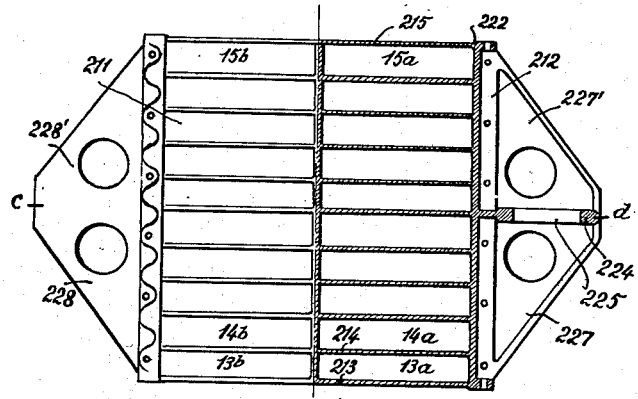
Figure 19:
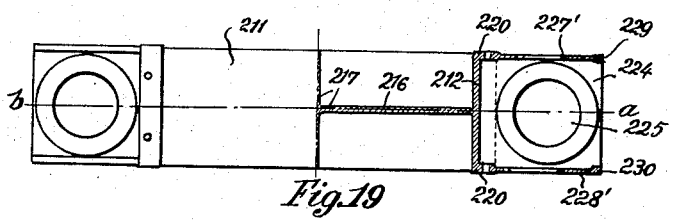

Figure 18 shows in the left half a side view of an intermediate element of the receptacle and in the right half a vertical section on the line $a-b$ of Fig. 19.

Figure 19 shows in the left half a view from above of an intermediate element of the receptacle, and in the right half a horizontal section on the line $c-d$ of Figure 18.

Figure 20:
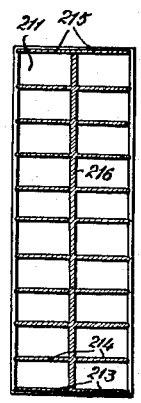

Figure 20 is a vertical section of one of the mentioned intermediate elements of the receptacle.

Figure 21 is a side view of a lateral element of the receptacle, in part section (on the right) on the broken line $g-h-i$ of Figure 22.

Figure 22 shows in the left half a view from above of the lateral element represented in Fig. 21, while in the right half there is shown a horizontal section on the line $e-f$ of Figure 21.

Figure 23 shows a vertical section of the lateral element represented in Figure 21, made at right angles to the latter on line $k-l$.

Figure 24 illustrates in section the details of a guide roller of the oscillating receptacle of the apparatus.

Figure 25:
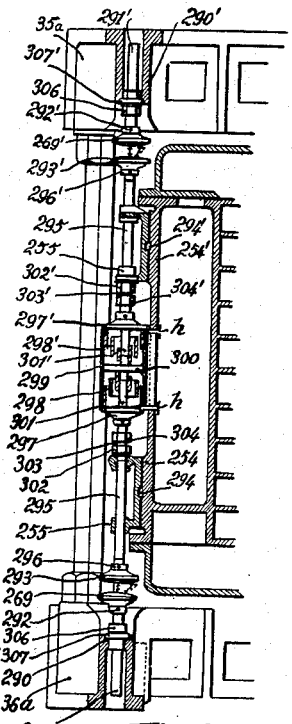

Figure 25 shows partly in section the details of the course limiters of the said oscillating receptacle.

Figure 28:
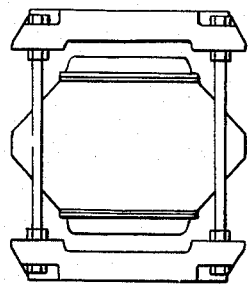
Figure 26:
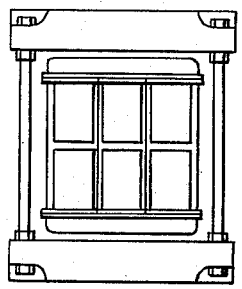
Figure 27:
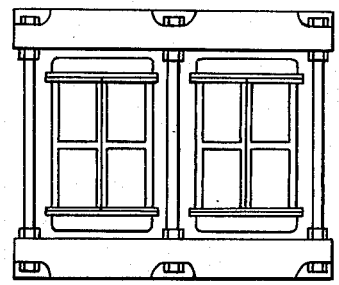

Figures 26 and 27 are similar to Figure 14 and illustrate diagrammatically some various examples of apparatus obtainable with the same foundry model suitably constructed and forming various types of a series, while Figure 28 is a side view of the apparatus of Figures 14, 26 and 27 which is the same for all types of the series.

Figure 27 also shows how, by inserting two further stanchions in the framework, two receptacles having nearly the same or different frequencies can be united into a single apparatus suitable for the compensation of composite vibrations.

Throughout the views, the same reference characters and numerals indicate the same or corresponding parts.

As will be apparent from the drawings, the mechanical compensating apparatus for the vibrations of a ship (Figs. 1 and 2) is formed by the metallic receptacle 1, provided with the flanged cover 2, fixed by means of bolts 3 to the receptacle 1. In the cover there is fixed the tube 4, which serves as vent for the air of the receptacle 1; the said vent may be lengthened by the flexible tube 5 and be fitted at its end with a closing cock 6 (Fig. 2); to the central part of the cover 2, duly drilled, there is attached, with the interposition of the joint 7, (Fig. 1) the flexible tube 8, the end of which is connected to the seawater system available on board and provided with a distributing arrangement; instead of seawater any other desired liquid could be used.

The flexible tube 8 therefore serves as conveyor of liquid into the receptacle 1, which liquid must be introduced in a controllable quantity, which is necessary in order to obtain the tranquil condition of the structure, and which condition may be determined by reading a suitable instrument for registering the vibrations of the structure or a vibrograph, or, in the case of a ship, directly by the operator, when he no longer can feel vibrations on board.

Figure 3:
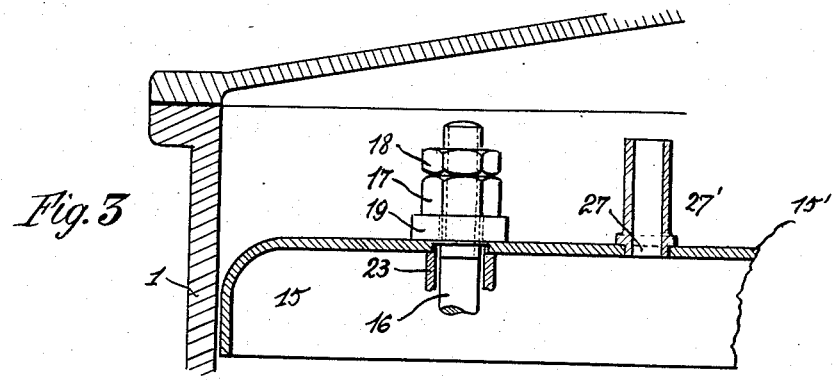
Figs. 3 and 4 show in section on a larger scale the detail of the upper and lower attachment, respectively, of the rod which keeps the diaphragms in position inside the container for the liquid.
Figure 4:
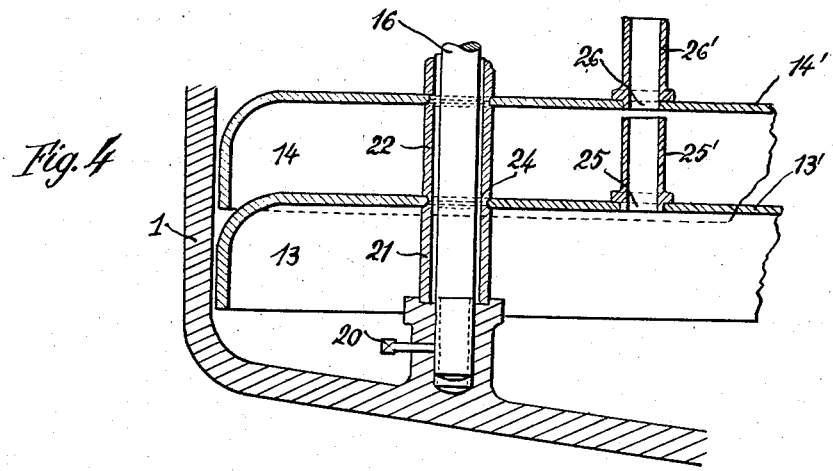

The liquid introduced into the receptacle flows in the direction indicated by the arrow 9 along the vertical walls to the bottom, filling the flexible suitably closed discharge tube 10, which is connected with the discharge system existing on board, to rise again following the arrows 11, 12 . . . and then successively entering the vessels 13, 14 . . . 15 formed by the diaphragms 13', 14' . . . 15', bent downwards at the sides, as clearly seen in Figures 3 and 4. The diaphragms 13', 14' . . . 15' preferably made of copper laminæ, are held together by rods 16, furnished with nut 17, lock-nut 18, and washer 19, at the upper extremity, and have the narrower lower extremity screwed on the bottom of the receptacle 1, and held tight by means of pressure screw 20. Each rod 16 is surrounded by a series of rigid concentric tubes, arranged one above the other, 21, 22 . . . 23, in the same way as are the diaphragms 13', 14' . . . 15', and spaced apart by the thickness of the diaphragms themselves, which is greater towards the outside of the tube and is smaller on the inner side, due to the presence of holes 24 in each diaphragm in a number equal to that of the rods 16. The tubes 21, 22, . . . 23 serve to rigidly space the diaphragms 13', 14' . . . 15' from each other, and as these tubes are tightly held by the rods 16, which are in turn held below on the bottom of the receptacle 1, it follows that a displacement of the liquid within the receptacle 1 during its oscillations is rendered practically impossible, the desired result thus being that the mass of the liquid forms a single solid unit with the mass of the receptable which contains it. Each diaphragm is provided at the top with one or more apertures, 25, 26 . . . 27, for the escape of air, to which are applied tubes 25', 26' . . . 27' respectively, opening freely into the vessels 14 . . . and 15 above. The purpose of these tubes is to prevent the liquid of the lower vessel from overflowing in a violent manner and in an appreciable quantity into the next vessel above, during the vibrations of the receptacle 1.

In place of the flexible tubes 8 and 10, there could be arranged at the bottom of the receptacle 1, a single flexible tube attached at one end to the receptacle and at the other end to a union 10' (Fig. 11) the tube being rigid and bifurcated, so as to allow the flow of the liquid either to a feeding branch 28, or to a discharge branch 29. The feeding tubes 28 and discharge tubes 29 are provided with suitable closing devices 30 and 31, respectively.

The receptacle 1 is supported by a system of spiral springs 32 (Figs. 1 and 2) which in number and strength are determined for each particular case, by means of simple calculations which are referred to later on, fixed with their ends to the ribbed cross-pieces 33 and 34 of a robust upper and lower framework 35 and 36, connected in any desired manner at predetermined points of the ship, while they are intermediately fixed to one of the ribs 37, projecting from the sides of the receptacle 1. There are shown in the drawings by way of example eight springs 32, each one in two parts, four springs in the front and four at the rear.

Figure 5:
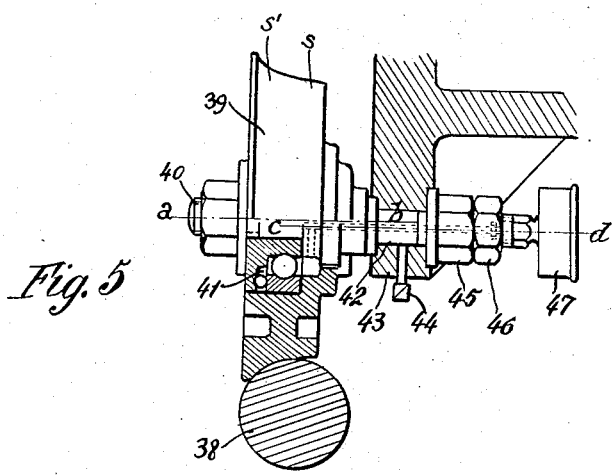
Fig. 5 shows partly in section the details of a guide roller of the oscillating mass of the apparatus.

The apparatus is completed by the four stanchions 38, on each of which there run, parallel to the axis of the springs 32, two rollers 39 guiding the oscillating vibratory movement of the receptacle 1. These rollers 39 are rotatably mounted on the pivots 40 (Fig. 5) with ball bearings 41. These pivots 40 are suitably arranged in such a way as to present on the left-hand side of the figure, the centre line a—b slightly displaced with regard to the line c—d which is the axis of rotation of the right-hand side. The purpose of this is to facilitate, after the introduction of the pivots 40 in the holes 42 present in the ribs 43 forming a projection of the receptacle 1 of the apparatus, the regulation of the course of the receptacle 1, before tightening up the pressure screws 44, the nut 45 and the lock nut 46, also finally the grease-cup 47. The lateral surface s of the roller 39 is slightly conical and to this there corresponds a circular sector s' with a slightly larger radius of the stanchions 38, to ensure an easy running of the rollers 39 and a continuous contact between the same and the stanchions 38 themselves.

Figure 1:
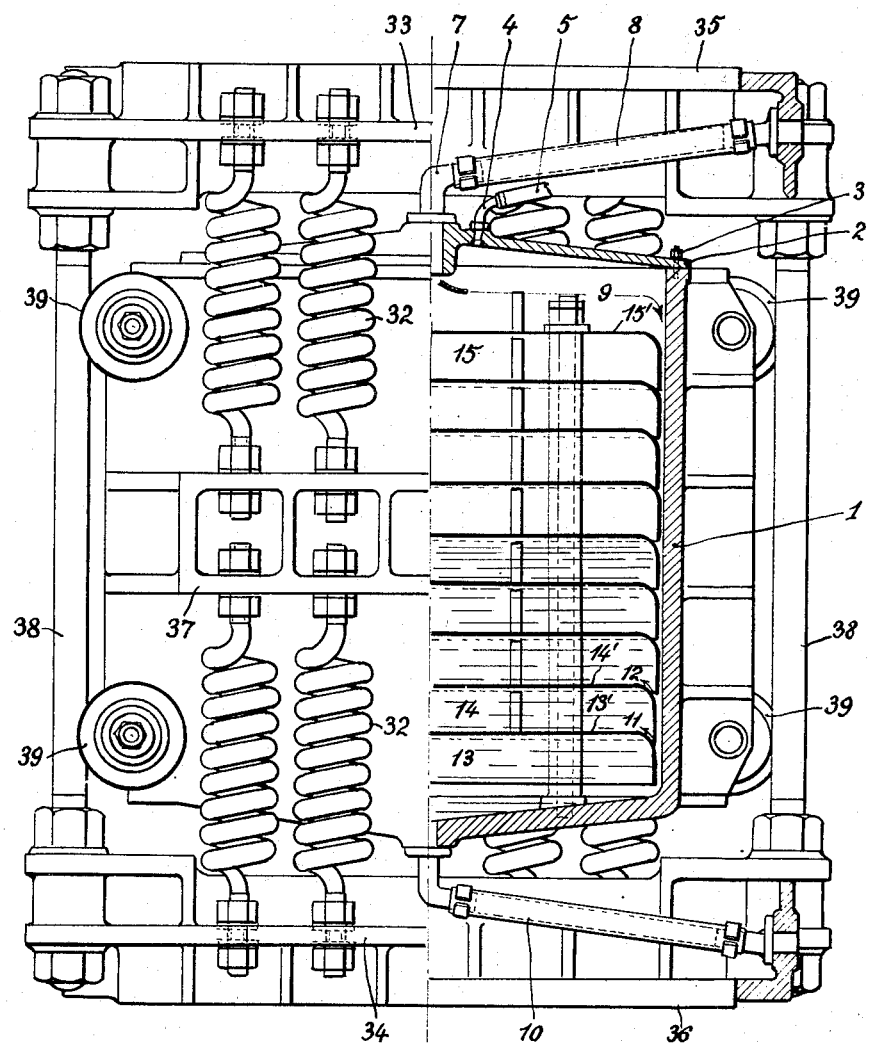
Figure 2:
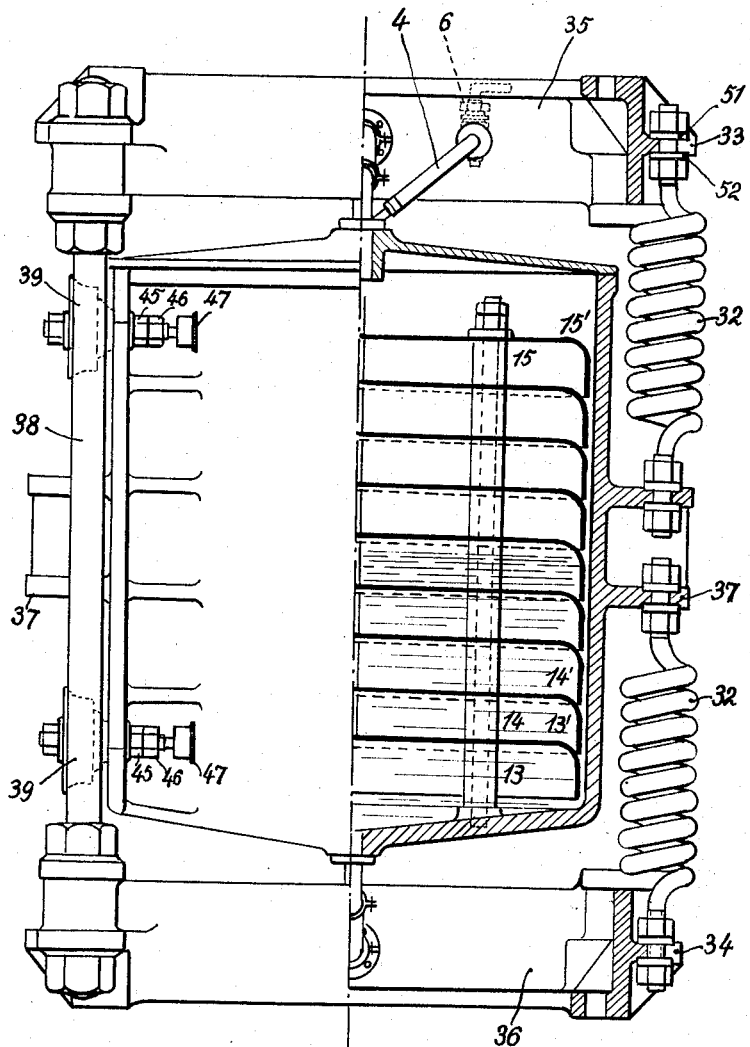
Fig. 2 is on the left half a side view of Fig. 1, the right half being a vertical section at right angles compared with that of Fig. 1; in this figure for the sake of greater clearness the springs are omitted in the left half, and the stanchion in the right half.

The stanchions 38, besides acting as guides to the roller 39, also serves the purpose of transmitting to the structures of the two bridges of the ship between which the apparatus is connected, the compensating forces from receptacle 1 in case the springs are not made in two halves. As shown in Figs. 1, 2 and 8, it is possible to dispense with either half (lower or upper) of the springs, instead so many halves on the remaining parts of the receptacle or substituting for the two halves of each spring a corresponding single spring, and this can be done without altering the compensating capacity of the apparatus.

The springs shown in Figs. 1, 2 and 8 do not require prior tension and can be dimensioned directly in relation to the total compensating force. In the case of springs in Figs. 9 and 10, however, this advantage is not obtainable. In this case it is necessary for the springs 32 to be previously compressed in order to obtain a spring movement corresponding at least to the compensating force plus the weight of the receptacle 1. These must, however, be large enough to be able to support, in addition to the weight of the receptacle, at least twice the compensating force.

The ribbed cross-pieces 33 and 34 have the point of attachment of the springs 32 shown in the Figs. 6 and 7, and it will be noted that each cross piece has a notch 48, also two concentric holes 49 and 50, to serve as seats for the washers 51 and 52 (Figs. 2, 8) for fixing the ends of the spring 32. This arrangement facilitates the easy replacement of one spring (or of half a spring) in case of breakage.

In Fig. 8 the washers 51 and 52, arranged in the holes 49 and 50 of the cross-pieces 33 and 34 respectively, serve, together with the second washer 53, with the nut 54 and lock-nut 55, to fasten not the end of the spring 32', but the pivot 56, the lower end of which is introduced into the pieces 57 and 58 having two opposite surfaces shaped as male and female and leaving in the closed position a space e, sufficient to form a clearance at the moment of mounting the end of the spring 32', which is arranged in the predetermined grooves of the pieces 57 and 58. The fixing of the spring is obtained by fastening the washer 59 by means of the nut 60 above it against the surface of the piece 57. A similar fastening serves for the attachment of the spring to the ribbing 31 of the receptacle 1.

With this arrangement it is possible to exclude one or more turns of the spring 32', thus adjusting the value of the capacity of thrust of the spring per unit of spring movement, and in consequence varying the relation between this capacity and the mass of the receptacle 1, instead of attaining the same object by means of the more simple variation of the level of the liquid within the receptacle itself, as described in the case of Figs. 1 and 2.

The compensating apparatus for horizontal vibrations according to Figs. 11, 12 and 13, in addition to the described feeding and discharge of liquid in the receptacle 1, by virtue of the interception of the single diaphragms 13', 14' ... 15' contained in the receptacle, also has a system of rods 16 as in the compensating apparatus for vertical vibrations, which rods are connected to the receptacle 1, at their lower ends, also at their upper ends, by means of solid cross-pieces 61 drilled to correspond with the rods and fixed to the upper diaphragm by means of the same nuts and lock-nuts used for fastening the rods. The cross-pieces 61 are duly fixed by their ends to walls of the receptacle 1 and serve to prevent slackening of lower fastening of the rods 16, which would occur with the passage of time owing to the moment of inertia of the water weighing down on the walls of the diaphragms 13', 14' ... 15' during the horizontal oscillating movement of the receptacle 1. The system of diaphragms 13', 14' ... 15' could be replaced (as also in the case of the compensating device for vertical vibrations) by a group of horizontal tubes duly anchored and arranged with the axis normal to the direction of oscillating movement of the receptacle 1.

The receptacle 1 rests on rollers 62 with ball bearings or oscillating rollers mounted on the pivots 63, which are fixed at their ends to the lower framework 36, forming a true and proper base of the apparatus. The mounting of such pivots 63 takes place in a similar manner to that of the springs 32 (Figs. 1, 2, 6, 7 and 8) that is, they are inserted in the notches 48 present in the base 36 and tightened by means of washer 51 and nut 54.

To prevent then any displacement of the receptacle 1 in the plane normal to the direction of its oscillations, there are four rollers 39 similar to those of Figs. 1 and 2, arranged above and fixed on projection 43 of the receptacle 1, and resting against ribbing 64 of the upper framework 35 of the apparatus.

When practically applying the device to a vibrating structure it is necessary in the first place to determine the frequency of the vibrations to be compensated, using, for example a vibrograph, so as to ascertain the component of the kinetic forces of the single parts composing the motive apparatus or that of the active forces (pressure of gas and the like) of the same which produces the vibration of the structure. Then there should also be determined, with the vibrographic projection or other means, the interval at which the vibrations of the order relative to the projected frequency occur, the term "order" being understood to mean the number of the vibrations of the structure during one revolution of the motive apparatus. That is to say, the minimum frequency and the maximum frequency of the vibrations which have to be compensated are determined.

Then, making use of the known formulæ:

(1) $$N = \frac{30}{\pi}\sqrt{\frac{C}{m}}$$

(2) $$P = \left(\frac{\pi}{30}\right)^2 m a N^2$$

in which

N=frequency proper to the first minute, of an elastic device capable of transmitting to the mass $m$ ... in kg/cm/sec$^2$ a unitary thrust of C ... kg/cm per 1 cm. of compression of the elastic system, and P=inertia in kgs. of the mass at the moment of its maximum displacement during its harmonic oscillating motion of amplitude.

$a$ ... in cm., the weight Q in kgs. of the oscillating parts of the compensating apparatus is determined, inserting the amplitude $a$ of oscillations or deflection of the same by means of the Formula 3 derived from the Formula 2:—

(3) $$Q = 8.95 \cdot 10^4 \frac{P}{N_1^2 \cdot a}$$

in which N=maximum frequency of the vibrating structure. Then, with due reference to the minimum frequency $N_2$, the weight L of the liquid which will have to be introduced into the receptacle is determined, this being done by means of the Formula 4 derived from Formula 1:—

(4) $$L = Q\left(\frac{N_1^2}{N_2^2} - 1\right)$$

Lastly the capacity of complementary thrust C in kg/cm of the springs per unit of compression is determined by means of the Formula 5 also derived from Formula 1:—

(5) $$C = 1.12 \cdot 10^{-5} \cdot Q \cdot N_1^2.$$

When this is done, there is suitably distributed over a certain number $n$ of springs such thrust capacity C, that each spring will have to be able to satisfy a capacity of thrust $$\frac{C}{n}$$

and support the alternating harmonic force $$\frac{P}{n}$$

with sufficient security having regard to its permanent resistance.

For example, if in a ship there is determined by means of a vibrographic projection a vertical vibration of order III at 110 revolutions of the motive apparatus, that is to say a vibration of frequency 330 per min., and there is established by means of the same projection that the interval in which these vibrations occur is practically situated between 100 and 120 revolutions of the motive apparatus, and if we suppose, moreover that it has already been established that these vibrations are due to a force P=about 5,000 kg. transmitted to the ship by the three blades of the propeller, then there will be placed at the stern of the ship a device for compensating vertical vibrations, the oscillating weight of which, on the basis of an oscillating motion of the same having an amplitude of 2 cms., will have to be, according to Formula 3:—

$$Q = 8.95 \cdot 10^4 \cdot \frac{5000}{360^2} \cdot \frac{1}{2} = 1730 kg.$$

The weight of the liquid which will have to be introduced during the adjustment into the receptacle will, according to Formula 4, be equal to:—

$$L = 1730(1.2^2 - 1) = 770 kg.$$

The capacity of complementary thrust C of the springs per unit of compression will have to correspond, according to Formula 5, to:—

$$C = 1.12 \cdot 10^{-5} \cdot 1730 \cdot 1.296 \cdot 10^5 = 2500 \ kg/cm.,$$

so that, sub-dividing such capacity over 10 springs, the resulting springs will each have a capacity of 250 kg/cm. unitary thrust, which will have to be capable of supporting an alternating harmonic force $$\frac{P}{10} = 500 \ kg.$$

with sufficient security with due regard to the permanent resistance. Such spring should therefore resist a static force of at least 2500 kg. when loaded with 3,000 kg/cm.² and undergo with this load of 2500 kg. a compression of 10 cm., besides resisting the maximum static load of 2500 kg., so that every spring will have to serve for a maximum load of $$P + \frac{Q}{n} = 2750 \ kg.,$$

giving a compression of 110 mm. These springs may be of the spiral type, as in the example in Figs. 1 and 2.

In other cases it may be more advantageous to select laminated or other springs, or perhaps also other elastic systems, as for example, rubber.

In the case of the example calculated, the apparatus was placed at the precise point where the strain to be compensated was transmitted to the structure, as this strain was due to the propeller and the apparatus was placed in the stern. If, however, the apparatus is not placed at the point of application of the strain to be compensated, but at a different point which, as before stated, must not be situated in a nodal section, it will be necessary to calculate by how much the force of compensation of the apparatus must be increased or decreased relative to the force P, the vibration effects of which it is desired to compensate, due regard being had to the bending moment corresponding to the distance of the apparatus from the point of application of the force P itself.

In this case the oscillating movement of the apparatus no longer provokes the force P directly, but certainly the residual vibration of the structure, which vibration necessarily remains of the same phase as the primary vibration of the structure existing without the application of the apparatus. This vibration is out of phase relative to the force P which produces it, since it is a question of a vibratory phenomenon of a frequency greater or less than the frequency of the structure itself by an angle less or greater than 90°, the size of which, in the case of vibrations of ships, is sometimes indeterminable. But since, by introducing the liquid into the receptacle 1, the frequency of the apparatus itself relative to the frequency of the vibrations to be compensated in the structure can be varied, it can be arranged to have this receptacle vibrate in the restricted interval of its resonance (restricted because the apparatus has practically very little friction) compared with the permanent vibrations of the structure, the phase displacement having any desired angle contained between the two practically constant values of phase displacement, which values are determined by the interval of this resonance. Two forces may legitimately be imagined as acting on receptacle 1 duly adjusted, these forces being out of phase with each other by 180° and of a magnitude equal to the force of compensation of the apparatus at the point of action of the force P, the force in phase with force P tending together therewith to accentuate the vibration of the structure, while the second force, forming together with the force of compensation of the apparatus a moment of opposite phase, neutralizes the vibrations due to the two first, up to the limit of a permanent minimum vibration, which can in practice be ignored and which is normally only registrable by means of sensitive vibrographs.

The apparatus of the invention thus makes it possible to obtain the desired degree of compensation, using the most simple means which could be at one's disposal on board, that is to say, of sea water which is available in the sanitary pipes of the vessel. This apparatus renders the previous laborious calculations superfluous regarding resonance phenomena in ships, as it is adjustable to readily compensate the vibrations of the structures, whatever the angle of phase displacement may be between the force producing the vibrations of the structure and the vibrations themselves.

Thus it follows that two similar apparatus arranged in two different ships, which vibrate with the same frequency, will perhaps require different adjustment.

The apparatus will also have to be differently adjusted at the same number of revolutions and on the same ship, according to the displacement of this latter, since the particular frequency of a ship varies with the displacement and with this the angle of phase displacement between the force P producing the vibration and the vibration of the structure also varies.

The indicator of the water level applicable to a device as in Fig. 11, should thus be understood to be suitable for indicating the initial adjustment of the liquid, since the scale of the indicator cannot be easily calculated a priori except with the employment of Formula 1 from which the frequencies of the apparatus itself exclusively result. The final adjustment must ultimately be carried out by the operator himself.

Also if then the last vessel 13, 14 . . . is not completely filled, the lack of complete filling would not have any practical influence on the exact effects. The efficiency of equalization of the device exceeds 90% in actual test. The order of magnitude of the vibrations of a ship, which are vertical, horizontal and torsional, varies with their grade, deducible from the curve of the amplitudes, the first grade being understood to correspond to a curve having two nodes; the second grade to correspond to a curve having three nodes, and so on, and in fact, the grade diminishes as the degree of the vibrations increases. The frequency of the vibrations on the other hand increases with the grade. The apparatus embodying the invention, duly adjusted with regard to the number and to the strength of the springs, as also with regard to the weight of the liquid in the receptacle, normally serves to compensate vibrations of a single grade for the whole interval however in which the vibrations themselves occur. But since the vibrations of the ship within the ambit of the revolutions involved are normally of a single grade, one single device only will normally be required. When two vibratory phenomena of the structure occur, even if of the same grade, but of slightly different frequency, as for instance where two engines of a ship with two propellers turn with a slightly different number of revolutions per minute, two apparatus are arranged. Where instead there are present two vibratory phenomena of a different grade, which occurs only rarely, there would also be required two apparatus. In a ship having torsional vibrations, two apparatus are always required.

In the case of small vibrations, as with the partial ones of single parts of the structure, and when oscillations of the receptacle 1 of the apparatus are present, due to contripetal harmonic accelerations transmitted to the receptacle itself by the elastic system which are on the whole substantially smaller than the terrestrial acceleration, the weight in the suitably modified apparatus may be adjusted by means of lead shot, sand, or other solid material instead of by means of liquid, although the latter normally offers simple and the most suitable adjusting means.

In Figs. 14 to 28, is illustrated another embodiment of the invention improved so as to better satisfy practical, industrial and constructional requirements, and also to permit the construction of the apparatus in series.

This second manner of construction differs from that already described by having a different and more simple construction of the diaphragms, which are made stationary and integral with the single elements of the receptacle which form the heavy mass, which facilitates lateral erection of the receptacle on board a ship, being almost always necessary, and at the same time provides for greater solidity. Moreover the original receptacle has in this form two spaces separated from that intended for carrying the liquid, so that it is possible to make a light receptacle, and then increase the weight—according to the requirements of the finished apparatus—by filling the connected spaces with solid or any other mass until the minimum weight required is reached. This adjustment facilitates the elimination of the detrimental influence on the proper functioning of the apparatus, due to the capacity of thrust of the springs being technically obtainable only with a certain approximation to the calculated thrust. Therefore tolerances with greater characteristics may be allowed for the springs than in the first form of the apparatus. The receptacle is then sub-divided into a series of lateral and intermediate elements. The periods of resonance of the vibrations to be compensated are not always equal in extent and a more extended period requires an apparatus with greater volumetric capacity of the receptacle for holding the liquid than a period of less extent. The subdivision of the receptacle therefore allows receptacles to be made up having a larger or smaller number of intermediate elements, but all of the same weight; so that apparatus can be obtained of the same capacity having more or less extended fields of operation, according to requirements.

The apparatus embodying this second form of the invention differs from that previously described by the addition of course limiters for the oscillating receptacle which are necessary on board a ship to prevent excessive strains on the springs owing to sudden shocks caused by waves.

Finally the attachment of the springs to the framework has also been altered to facilitate the production of a foundry model, which when suitably designed might serve for the casting of all the various types of a series of apparatus, and it is likewise possible, with the provision of two further stanchions in the framework to unite two apparatus having different frequencies into a single apparatus of the series and in this way an apparatus suitable for the compensation of composite vibrations can be made up.

As shown in Figs. 14-28 of the drawings the apparatus according to the second manner of construction serves particularly to compensate the vertical vibrations of a ship. In this apparatus the compensatory oscillating mass is formed by a metallic container able to hold a certain quantity of liquid. The object of this liquid is to increase the mass of the receptacle and thereby influence the frequency of the apparatus itself. In order, however, to avoid the apparatus becoming deficient in mass during its oscillating movement it is provided internally with diaphragms so as to prevent a displacement of the liquid in the interior of the container itself and this renders the mass of the liquid practically solid with the mass of said container.

The receptacle 1 has a flanged bottom 201 (Figs. 15, 16), duly strengthened by ribbing to withstand the pressure of the inertia of the liquid during the oscillating movement of the receptacle. The bottom 201 is provided with a bored projection 202 for the attachment of the flexible admission and discharge pipe for the liquid 10a which is attached to said projection 202 by means of the union 10'. In addition, the bottom is provided with two further bored projections or protuberances 203, 204. To 203 is attached a union 205 of the level indicator 206 for the liquid contained in the receptacle, while the other protuberance 204 is fitted with a blind flange 207. The arrangement of the two protuberances 203, 204 is intended to facilitate the mounting of the level indicator 206 on the most convenient side having regard to the necessity for keeping the apparatus under observation when it is functioning.

On the upper flanged edge 208 of the bottom 201 lateral elements 209—210 are attached intermediate elements 211 of the receptacle.

The intermediate elements 211 (Figs. 16, 19, 20) are formed by two vertical flanged walls 212 joined together by horizontal rods 213, 214 . . . and 215, and a central vertical rod 216. The rod 217 parallel to the walls 212 joins the rods 213, 214 . . . and 215, increases the resistance of the same and with their aid subdivides the element into a series of spaces 13a, 14a . . . or 15a, 13b, 14b . . . 15b, for holding the adjusting liquid. The bottom flanges 218, 219 of the walls 212 serve to attach the elements to the flanged edge 208 of the bottom 201 (Figs. 15 and 16), while the flanges 220, together with the flanges 222, which connect the elements to each other (Fig. 18) serve to hold the cover 2a of the receptacle. Grooves 223 are provided on the flanges for supplying red lead, manganese paste or other material, when, as is preferable, it is desired to have metallic contact for connecting the flanges. At half the height of each element there protrudes on both sides the horizontal rod 224 having a hole 225 for the reception of the seats 226 (Fig. 16) of the lower springs 32a and of the seats 226' of the upper springs 32'a. The rods 224 strengthen the rods 227, 228, 227' and 228', having the edges 229 and 230 respectively bulb-shaped.

The lateral elements 209, 210 (see Figs. 21, 22 and 23) are similar in construction to the intermediate elements except the internal lateral half, which is exteriorly closed by the wall 231 and contains a regulating box 232 for the fixed metallic weight of the receptacle.

The particular frequency of an elastic apparatus is defined by the relationship between the capacity of thrust of the elastic system per unit of compression (characteristic of the springs) and the value of the oscillatory mass. However, in order to obtain, with a given system of springs or other elastic system, an apparatus having a predetermined frequency, the correct relationship can be obtained by varying the value of the mass. In any particular case, a fixed weight can be added to a receptacle completely filled with liquid until the lowest compensatory frequency required is attained.

The addition of the boxes 232 to the receptacle consequently prevents any discordance between the proper calculated frequency and that obtainable with a simple mechanical construction. It permits normal tolerances of the weight of the receptacle and in the characteristics of the springs, and in addition makes it possible to accurately attain the requisite particular frequency. The particular frequencies of the complete apparatus are ascertained by introducing through the lateral apertures 233 (Fig. 15) the weight 234 into the boxes 232 and registering the number of vibrations of the apparatus by means of a vibrograph or other means, after having jolted the receptacle and afterwards having allowed it to settle down. When the required frequency is reached, pitch or other material is melted on the weight 234 and this melting material is introduced across the opening 233 (or if the cover is removed, across the opening 235 normally closed by the cover 236) into the boxes 232 to form the stratum 237. In this way the mass of the weight 234 is made integral with the mass of the receptacle, even if this weight is composed of material of small size. The opening 238 serves for the extraction if desired of the weight 234 and the opening 235 so as to be able the more easily to destroy the layer of pitch 237.

The surfaces opposite to the rods 213, 214 . . . 215 (Figs. 15, 20, 23) respectively of two consecutive elements of the receptacle are inclined towards the bottom, so as to leave free a gap (Fig. 16) narrower at the lower edge 239, 240, 241 . . . or 242 and a wider gap at the upper edge 243, 244, 245 . . . or 246. The liquid can, however, more easily move from an upper vessel 15a . . . into a lower one 14a . . . than it can rise from a lower to a higher one. In this way the distribution of the liquid within the oscillating receptacle remains practically the same as the distribution which is established with a closed receptacle. This causes the liquid to transmit to the walls 212 (Figs. 18–21) and to the rods 224 by pressing on the rods 213, 214 . . . 215, all the inertia of its weight in unchanged degree to the springs 32a and 32'a (Fig. 16) throughout the whole period of compensation of the apparatus required by the vibrating structure.

The closing walls 231 of the lateral elements 209, 210 have (Fig. 21), the protuberances 247 and 248 for the closing ports 249 and 250 (Fig. 15) of the apertures 233 and 238 for filling and withdrawing the weight into the spaces 232, the projections 251, 252' and 252 (Fig. 21) for the attachment of the graduated scale 253 (Figs. 15 and 16) of the level indicator 206, the protuberances 254, 254' (Fig. 21) for the attachment of the supports 255 and 255' (Fig. 16) of the course limiters, the protuberances 256 and 257 (Fig. 21) for the attachment of the supports 258 and 259 (Figs. 16 and 17) of the guide rollers, and finally the protuberance 260 (Fig. 21) for attachment of the index 261 (Fig. 16) of the indicator of amplitude of oscillation of the receptacle.

The receptacle is completed by the flanged closing cover 2a (Fig. 15) bolted to the flange 222 of the element 209, 210 and 211. The cover 2a is provided, as is the bottom 201, with two drilled projections for the attachment of the union 263 of the level indicator 206, and for the attachment of a blind flange 264 respectively, and with the projection 265 for the attachment of the union 4a to which is connected the flexible pipe 5a for aerating the receptacle.

The receptacle is supported, with interposition of the seats 226 (Fig. 16), by a series of lower springs 32a, of a number and strength determined in each individual case by means of simple calculations, as already explained,—normally two springs per element—which may be simple or multiple. In Fig. 16 the springs are double. The springs 32a rest on the fixed seats 226, by means of bolts 267 in the lower framework 36a of the apparatus.

These springs are compressed once by an amount corresponding to the magnitude of the weight of the receptacle. If this is provided for, and if, moreover, it is provided that the amplitude of the oscillations of compensation of the receptacle does not exceed the initial amount of compression due to its weight, then having regard to the function of the receptacle, structurally, the upper springs 32'a would not be required. If, however, the amount of compression required for compensation exceeds the amount due to the weight which occurs whenever it is desired to give to the apparatus a capacity of thrust of compensation greater than the weight of the receptacle, then the upper springs 32'a are necessary, the system being then as indicated in Fig. 16.

Taking now as point of departure the lower springs compressed by the weight, and supporting the springs 32'a on the seats 226' while compressing the springs 32'a by fastening the nuts of the fixing bolts 267 of the seats 266', it is found that simultaneously with upper springs 32'a, lower springs 32a are also compressed. As a result (as shown in Fig. 16) the lower springs 32a are compressed once by an amount due to the weight of the receptacle and in addition a second time by an amount equal to the compression of the upper springs 32'a. This latter amount must be equal to the maximum amplitude of the oscillation of the receptacle, plus the course which the course limiters provide for this receptacle. The corresponding compression must be given to the springs when the receptacle is completely filled with liquid. If then the liquid is discharged from the receptacle, the lower springs 32a are relieved and they stretch, and the upper springs on the contrary become loaded and compressed. This fact might by itself alone induce a constructor to give the same dimensions to the upper springs 32'a as to the lower springs 32a, and not to make, as would appear at first glance to be the more correct way, the upper springs 32'a weaker than the lower ones 32a. There is, however, a still stronger reason for making the upper springs equal to the lower springs.

Starting from the position with static equilibrium of the springs properly mounted, both springs become, during the oscillations of the receptacle, alternately compressed and relieved by the same amount. This working condition means an equal strain on the upper and on the lower springs, which in the long run is greater than the static load hitherto considered, not because of its absolute magnitude but because it means an alternating straining of the springs, which they must withstand with adequate security. The fatigue point with an alternating load is, however, very much lower than the fatigue point with a static load, for which reason it is advisable to make the upper and lower springs equal.

In any case, this point can be decided for each individual case. The seats 226, 226', 266, 266', suitably arranged, provide ample latitude for this without requiring any variation in construction of the receptacle, or respectively of its rod 224 having the hole 225 for receiving the seats 226 and 226', while upper framework 35a and lower framework 36a remain unchanged.

The receptacle is guided in the direction of its oscillation and parallel to the axis of the springs, by means of guide rollers 39a (Fig. 24) running on the stanchion 38a, which connect lower framework 36a and upper framework 35a. The axis of the stanchions is also parallel to the axis of the springs. These rollers 39a are rotatably mounted on the pivots 40a having ball bearings 41a, these pivots being suitably staggered so as to show on the right-hand side of the drawings centre line a—b slightly displaced with respect to the line c—d representing the axis of rotation of the left-hand part. The object is to facilitate, after the introduction of the pivots 41a into the holes 42a in the roller supports 258 and 259, which are fixed to the protuberances 256 and 257 of the lateral elements of the receptacle, the regulation of the direction of travel of the receptacle, before tightening the nut 45a (having washer 268) also finally the grease-cap 47a.

The lateral surface S of the roller 39a is slightly conical and thus corresponds to a circular sector S' having a slightly larger radius than stanchions 38a, to ensure an easy running of rollers 39a. The upper framework 35a and lower 36a (Fig. 16) together form a solid reaction support against the thrust of the springs and also serve for the connection of the apparatus at predetermined positions in the ship. The apparatus must normally discharge its force of compensation—apart from the case of partial vibrations of single girders of the ship—to the limbers which, extending from stem to stern, form a principal and sturdy transmission bracing for the vibrations. If the springs were supported on the weak connecting structure between the limbers or on the support beams for the deck, the nails in the vicinity of the apparatus would loosen. If, however, the springs are supported on robust cross-bars able to withstand the thrust of the springs without sudden deformations of any appreciable magnitude, then the force of the springs can be easily discharged across the saddles to the limbers. The apparatus is intended to be fixed between two bridges of the ship. Since the structures of the two bridges are never equal in resistance, the upper and lower framework 35a and 36a are connected by robust stanchions 38a. Thus it is quite certain that the distance between the seats 266 and 266' will remain the same during the functioning of the apparatus and that a force of compensation equal to that required by the condition which causes the vibration will be transmitted to the two bridges, between which the apparatus is connected. The two robust frameworks 35a and 36a joined by the stanchions 38a consequently prevent a partial deterioration of the structure in the vicinity of the apparatus and ensure an irreproachable compensation service. As shown in Fig. 16, these frameworks 35a and 36a also serve to fix the stationary thrust plates 269, 269' of the course limiters, and constitute supporting bodies for the flexible pipes 10a and 5a, and finally these are constructed in such a way as to facilitate an easy withdrawal or an easy introduction of a spring. By loosening nuts of the bolts 267 (or 267') the seat 266 descends (or the seat 266' rises) the spring stretches and is released from pressure, the seat 226 (or 226') comes away from the rod 224 of the receptacle and the spring can be removed by oblique withdrawal. The reverse procedure is followed when a spring has to be inserted. This work can also be carried out while the apparatus is in operation.

The frameworks 35a and 36a are mainly formed by two longitudinal traverses including horizontal plates 270 suitably shaped for receiving the seats 266 (or 266') of the springs and the stanchions 38a. The plates 270 are each supported by a robust vertical rod 271 (lightened by holes) along the whole length of plate 270; and by various rods 272 which are attached to the rod 271 and to plates 270 and arranged at a right angle to the rod 271 below plate 270 in line with the planes of union of the single elements of the receptacle and the wall 231 of the lateral elements. Both rod 271 and rods 272 are moreover attached to a rod 273 parallel to plate 270, projecting towards the same at the ends so as to provide a position for the external tightening bolts 274 (Fig. 16) of the stanchions 38a. The rod 273 carries, in line with the axis of the springs, suitably bored projections 275 for the fastening to the saddles of the vibrating structure, and for the same purpose along the rod 271 towards the interior, the drilled flange 276, flange 276 and the rod 271 being reinforced by the rods 277 arranged in line respectively with each rod 272 and drilled projection 275.

In the horizontal plates 270 and (looking at Fig. 3 bottom part), in the rods 273 at each extremity there is an aperture 278 to render possible the lateral erection of the stanchions 38a. A rod 279 connects by means of the edge 280 of the apertures 278 the plate 270 with the rod 273, for the purpose of facilitating a tight fastening of the nuts 274 and 281 of stanchions 38a. The nuts 274 and 281 are provided with washers 282 and 283 respectively arranged in predetermined notches 284 (Fig. 17) of plate 270 and of rod 273, the nuts 274 and 282 and the washers 282 and 283 being able to form respectively a single piece, as shown in Fig. 16.

The longitudinal traverses just described are similar for the lower framework 36a and for the upper framework 35a, which latter differ exclusively by the ribbed traverses 285 and 286, which are the connecting cross-pieces of the longitudinal traverses, the traverse 285 of the lower framework being provided with the piece 287 (Figs. 15 and 17) for the attachment of the feeding and discharge pipes of the liquid within the receptacle, the traverse 286 of the upper framework being without this attachment and provided exclusively with the projections 288 for attachment of the aerating tube of the receptacle; on the opposite side the frameworks 36a and 35a are completed respectively by a traverse with rods 289 equal for both frameworks.

In each of these traverses 285, 286 and 289 respectively two nuts 290 (Fig. 25) are screwed for receiving the spindles 291 carrying screwed at one end the thrust block plates 269 and 269', fitted with pins 292 and 292' respectively for regulating the maximum course F (see Fig. 25) of compensation of the receptacle. These plates 269 and 269' form the respective supports of the plates 293 and 293' of the course limiters, of the receptacle, when the apparatus is intended to compensate vibrations which may suddenly increase in amplitude and consequently strain the springs of the apparatus with danger of breakage of the same, as may, for example, happen in the case of a ship during a storm at sea or else during an exceptionally violent maneuver.

The course limiters as illustrated in Fig. 25 are bolted to the receptacle on the projections 254 and 254' respectively provided with grooves for receiving the pins 294 and 294' for adjusting the respective supports 255 and 255', while into the latter the spindles 295 and 295' pass, which spindles have screwed at one end the thrust block plates 293 and 293' provided with respective pins 296 and 296', and at the other end the support plates 297 and 297' of springs 298 and 298', guided either externally by the guide cylinder 299 divided by a diaphragm at the centre line of the second support plate 300, common to both springs 298 and 298', or guided internally by the extension 301 and 301' of the spindles 295 and 295' respectively. The springs 298 and 298' are held in tension by the tightening of the respective nuts 302 and 302' and rest on the supports 255 and 255', the nuts 302 and 302' having elastic washers 303 and 303' held tight by the respective lock nuts 304 and 304'. The sum of the two distances "h" between the plates 297 and 297' respectively and the cylinder 299 determines the additional amount of the maximum magnitude of compression F, which is allowed to the receptacle for unforseen shocks, as already mentioned above.

With the apparatus in operation, and with the receptacle duly adjusted (as will be explained later on) the amplitude of oscillation $F_1$ of the receptacle is intended to be read on the amplitude indicator. Then the difference is ascertained between the maximum amplitude F and the amplitude $F_1$ or this difference F—$F_1$ is referred to the plates 269 by means of a compass or other instrument, by resting one point of the compass on these plates, while the other point is held at a distance corresponding to F—$F_1$ in the direction of F, and plate 269 is turned and with it the pin 291 until plate 293 at the moment of its maximum travel touches the point of the compass turned towards it. Then the nut 306 is tightened, which in turn fixes the spindle 291 by the interposition of the elastic washer 307 between this nut 306 and the nut 290 fixed in the traverse 285, 286 and 289 of the framework.

If for some reason, the receptacle tends to increase its course, the plates 269 and 293 make contact after the attainment of the maximum course F and the nut 292 leaves its position on the support 255. The plate 297 in turn forms a fixed support for receiving the further compression of the springs 298 and 298', which is transmitted to them by the plate 297', which executes together with the receptacle the movement towards the lower part of the latter, as it is compelled to carry out this movement by the tightening of the nut 302' also by the washer 303' and by the lock nut 304', the nut 302' resting against the support 255' fixed to the receptacle. It is now evident that by means of this support a thrust is transmitted to the receptacle corresponding to the compression of the springs 298 and 298', which thrust is added to the thrust transmitted to the receptacle by the action of springs 32a and 32'a. The receptacle, immediately after contact occurs between plates 269 and 293 (respectively 269' and 293') then receives a thrust greater than required by its mass in order that it may carry out its oscillations of compensation in resonance with the frequency of vibration of the structure. The receptacle, however, reverses its course in less time than would be required by the vibrations of the structure and, having in this way passed out of phase, after the separation of plates 293 from plates 269, the receptacle is accelerated so that it calms down and at the same time returns into phase, so that the apparatus after the passing of the condition for its abnormal oscillations automatically resumes its compensatory function. In place of the course limiters just described, hydraulic and similar limiters could also be used.

The amplitude indicator (Fig. 16) consists of a graduated scale 305 having two holes 308 and a hook or catch 309. Above the holes passes a pivot screwed in the stanchion 38a, and prolonged to serve as a guide to a small compression spring compressed by the nut 310 suitably situated and screwed into the respective projecting pivot.

The bipartite ring 261 concentric with the stanchion and fixed to the projection 260 (Fig. 21) of the receptacle, lifts when the receptacle oscillates the catch 309 (Fig. 16) and with this the graduated scale 305 until the receptacle reverses its upward movement and begins to descend. In this position the graduated scale remains at rest owing to the pressure exercised on it by the springs threaded in the respective pivots and compressed by the nuts 310. The ring 261 is pierced to correspond with the centre line of the graduated scale and a mark on the periphery of the opening 311 registers with the zero of the scale 305, when the ring 261 rests on the catch 309 of the scale. The amplitude is read at the moment of reversal of the movement towards the bottom of the receptacle, or when the upward movement is about to begin. This indicator makes possible the adjustment for the different positions of the centre of the harmonic oscillating movement of the receptacle as these positions result from the different adjustments of the liquid in the receptacle. The graduated scale 305 can always be carried out if contact with the ring 261 in the highest position of the oscillating receptacle (to read the amplitude whenever this has diminished).

The regulating liquid taken through any desired fixed pipe joined to the admission valve 312 (Figs. 15, 16, 17) enters through this into box 287 of traverse 285 of the lower framework 36a and from this box 287 past the union 313, flexible pipe 10a, and union 10' into the receptacle, and rises after having filled the bottom of the same beyond the gaps 239, 240, 241 . . . into the space 13a, 14a . . . 15a of each element 209, 210 and 211 and beyond the opening of the projections 203, 204 and the union 205 into the level indicator 206, while the air of the receptacle, which also passes by the gaps 239, 240, 241 ... 242 is drawn off beyond the union 4a, fixed on the cover 2a, the flexible aerating pipe 5a, the union 314 (Fig. 15) attached to the drilled projection 298 of the traverse of the upper framework 35a, the three-way piece 315, the tube 316, the three-way piece 317 (Fig. 17) and finally the three-way piece 318 in the fixed discharge tube attached to this latter. The union 319 fitted with blind flange 320 makes it possible to have a symmetrical system, with respect to the centre line of the traverses 36a and 35a for the tubes just described in regard to the projection 321 (Fig. 16) of the cover 2a. The valve 322 attached to the three-way piece 315 remains closed normally and is only opened to introduce air into the receptacle during the discharge of the liquid, after first closing the admission valve 312 and opening the discharge valve 323 interposed between the three way piece 315, connected to the fixed discharge tube, and the box 287 of the traverse 286 of the lower framework 36a. The aerating conduit now described can also serve, when cock 322 is properly closed, as overflow pipe.

What I claim is:

1. Apparatus for compensating vibrations in ships and other vibrating structures, comprising a frame adapted to be secured to the vibrating structure and having guide means parallel with the directions of the vibrations to be compensated, and a weight mass resiliently suspended in said frame and provided with guide rollers making continuous contact with said guide means in order to guide and direct the movements of said weight mass and render the same effective in the intended directions, the weight mass and the resilient suspension thereof being independently adjustable.

2. Apparatus for compensating vibrations according to claim 1, wherein the weight mass consists of a hollow casing having a cover secured thereto, a vertical series of spaced, horizontal diaphragms rigidly disposed within said casing and having downwardly directed peripheral edges spaced from the bounding walls of the casing and serving as liquid receptacles, means for individually ventilating each diaphragm so that liquid may flow into the same from the edges thereof, an inlet port in said cover for introducing liquid into said casing, and an outlet port in the bottom of the casing for the escape of said liquid.

3. Apparatus for compensating vibrations in ships and other vibrating structures, comprising a frame adapted to be secured to the vibrating structure and consisting of a pair of rigid frame members secured together in spaced relation by means of a plurality of parallel posts, a weight mass in said frame provided with guide rollers making continuous contact with said posts in order to guide said weight mass in movement, lateral projections upon the weight mass, a plurality of helical springs connecting said spaced frame members with said lateral projections and being disposed practically parallel with said posts so as to resiliently suspend the weight mass between said spaced frame members, and means rendering said weight mass adjustable.

4. Apparatus for compensating vibrations in ships and other vibrating structures, comprising a frame adapted to be secured to the vibrating structure and having guide means parallel with the directions of the vibrations to be compensated, and a weight mass movably disposed in said frame and provided with guide rollers making continuous contact with said guide means in order to guide and direct the movements of said weight mass and render the same effective in the intended directions, and resilient means in said frame resiliently limiting movements of said weight mass along said guide means, the weight mass and resilient means being independently adjustable to the conditions of vibration encountered.

5. Apparatus for compensating vibrations according to claim 4, wherein the weight mass consists of a hollow casing having a cover secured thereto, a series of superposed, spaced and horizontal diaphragms rigidly disposed within said casing and having downwardly directed peripheral edges spaced from the bounding walls of the casing and serving as liquid receptacles, means for individually connecting each diaphragm with the space above the same so that liquid may flow within the diaphragms from the edges thereof, a feeding tube for introducing liquid into said casing through said cover, and an outlet port in the bottom of the casing for the escape of liquid from the same.

6. Apparatus for compensating vibrations according to claim 3, wherein the weight mass consists of a hollow casing having a cover secured thereto, a series of superposed, spaced and horizontal diaphragms rigidly supported by means secured to the interior of said casing and having downwardly directed peripheral edges spaced from the bounding walls of the casing and serving as liquid receptacles, means for individually connecting each diaphragm with the space above the same so that liquid may flow within the diaphragms from the edges thereof, a feeding tube for introducing liquid into said casing through said cover, and an outlet port in the bottom of the casing for the escape of liquid from the same, the springs being adjustable to suit the conditions of vibration.

7. Apparatus for compensating vibrations according to claim 4, wherein the weight mass consists of a hollow casing having a cover secured thereto, a series of superposed, spaced and horizontal diaphragms rigidly disposed within said casing and having downwardly directed peripheral edges spaced from the bounding walls of the casing and serving as liquid receptacles, means for individually connecting each diaphragm with the space above the same so that liquid may flow within the diaphragms from the edges thereof, a level indicator for the liquid within the casing, a bipartite member pivoted to the frame and having hollowed portions for receiving the ends of a plurality of resilient means which are individually removable and replaceable to adjust the compensating effect of said resilient means, a feeding tube for introducing liquid into the casing through the cover, and an outlet port in the bottom of said casing for the escape of liquid from the same.

8. Apparatus for compensating vibrations according to claim 4, wherein the resilient means include compression springs and the frame includes upper and lower frame members having portions accommodating said compression springs and allowing individual oblique removal or replacement thereof in order to adjust the compensating effect of the springs or resilient means in ensemble.

9. Apparatus for compensating vibrations according to claim 4, wherein the weight mass consists of a hollow casing having a cover secured thereto, a series of superposed, spaced and horizontal diaphragms rigidly disposed within said casing and having downwardly directed peripheral edges spaced from the bounding walls of the casing and serving as liquid receptacles, means for individually connecting each diaphragm with the space above the same so that liquid may flow within the diaphragms from the edges thereof, a feeding tube for introducing liquid into said casing through said cover, an outlet port in the bottom of the casing for the escape of liquid from the same, a single union connected to the end of both the inlet tube and to the outlet port in order to cause feeding and discharge of liquid to and from the casing from the lower part thereof, and closing devices individually controlling said inlet tube and outlet ports.

10. Apparatus for compensating vibrations according to claim 4, wherein the resilient means include a plurality of helical springs in the frame, and supporting rollers upon portions of said frame directly supporting the weight mass and carrying the weight thereof.

11. Apparatus for compensating vibrations according to claim 4, wherein the weight mass is adjustable to adjust the compensation thereof by means of solid ballast added to or subtracted therefrom.

12. Apparatus for compensating vibrations according to claim 3, wherein the weight mass is hollow to constitute a receptacle subdivided into a plurality of elements and adapted to receive ballast means, and limit means preventing undue straining and elongation of the springs beyond predetermined limits.

UGO LOSER.